(12) United States Patent
Matsui et al.

(10) Patent No.: US 7,641,578 B2
(45) Date of Patent: Jan. 5, 2010

(54) DOUBLE-FACE DRIVING SILENT CHAIN AND SILENT CHAIN POWER TRANSMISSION DEVICE USING THE SAME

(75) Inventors: Nobuyuki Matsui, Kaga (JP); Masahiro Nagae, Kaga (JP)

(73) Assignee: Daido Kogyo Co., Ltd., Ishikawa-Ken (JP)

( * ) Notice: Subject to any disclaimer, the term of this patent is extended or adjusted under 35 U.S.C. 154(b) by 819 days.

(21) Appl. No.: 11/151,273

(22) Filed: Jun. 14, 2005

(65) Prior Publication Data

US 2006/0199691 A1     Sep. 7, 2006

(30) Foreign Application Priority Data

Mar. 4, 2005 (JP) ............................. 2005-060899

(51) Int. Cl.
*F16G 13/04* (2006.01)
*F16H 7/06* (2006.01)

(52) U.S. Cl. ................. 474/212; 474/213; 474/156; 474/206

(58) Field of Classification Search ............. 474/212, 474/213, 206, 156
See application file for complete search history.

(56) References Cited

U.S. PATENT DOCUMENTS 1,140,319 A * 5/1915 Houten ................. 474/139
5,345,753 A * 9/1994 Okuda et al. ................. 59/5
5,989,140 A * 11/1999 Ichikawa et al. ............ 474/148
6,142,902 A * 11/2000 Ichikawa et al. ............ 474/212
6,364,800 B1 * 4/2002 Avramidis et al. .......... 474/213
6,805,646 B2 * 10/2004 Kozakura et al. .......... 474/213
2002/0013191 A1 * 1/2002 Saito et al. .................. 474/213
2002/0025870 A1 * 2/2002 Kozakura et al. .......... 474/214
2002/0061800 A1 * 5/2002 Saito .......................... 474/212
2002/0155911 A1 * 10/2002 Hummel et al. ............ 474/212

FOREIGN PATENT DOCUMENTS

JP    11-166600    * 12/1997
JP    11-257439    * 12/1998

* cited by examiner

*Primary Examiner*—Robert A Siconolfi
*Assistant Examiner*—Mahbubur Rashid
(74) *Attorney, Agent, or Firm*—Wenderoth, Lind & Ponack L.L.P.

(57) ABSTRACT

There is provided a double-face driving silent chain wherein the size of each inner link plate of an exterior driving link train to a back face thereof is set to be equal to or greater than the size of each link plate of an interior driving link train. Thereby, inner side planes of the back face of the inner link plate abut against the both side planes of an interior driving sprocket and guide and prevent the silent chain from engaging with the sprocket in twist. All the link plates, other than the inner link plates of the exterior driving link train, have the same shape when seen from the side and the outermost link plate of the interior driving link train is thin as compared to the other link plates.

14 Claims, 9 Drawing Sheets

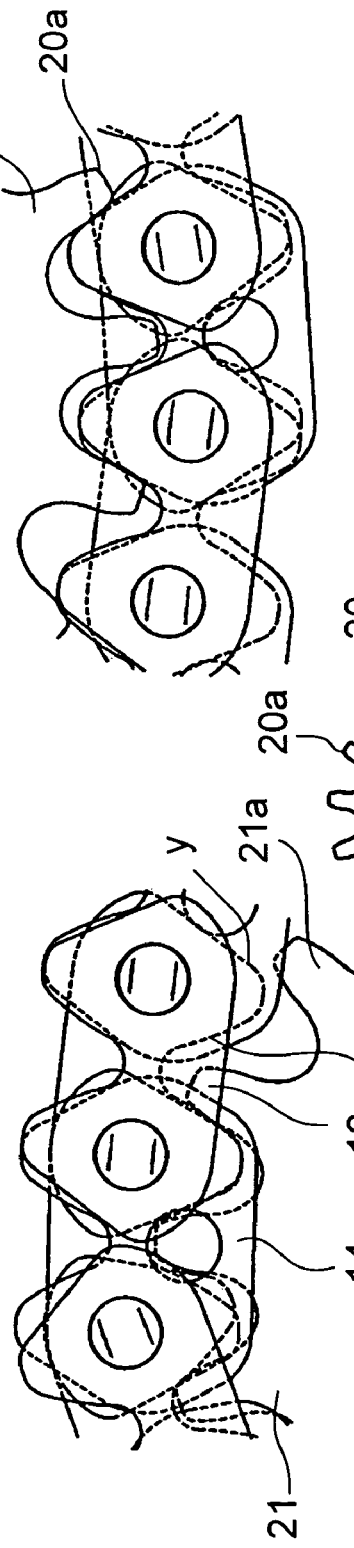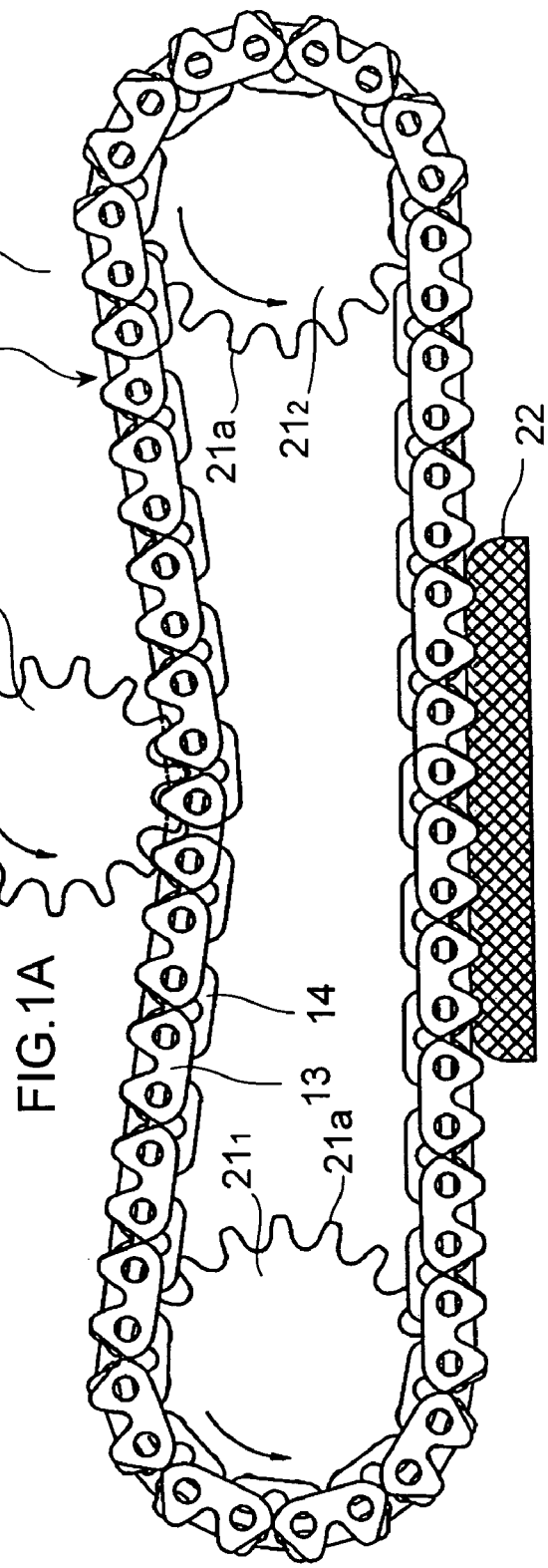

DOUBLE-FACE DRIVING SILENT CHAIN AND SILENT CHAIN POWER TRANSMISSION DEVICE USING THE SAME

BACKGROUND OF THE INVENTION

1. Field of the Invention

The present invention relates to a double-face driving silent chain engaging with sprockets within and without the endless silent chain as well as to a double-face driving silent chain power transmission device using the silent chain.

2. Description of Related Art

Recently, it has been proposed to use a silent chain as a timing chain for transmitting rotation of an engine crankshaft to a camshaft and to a shaft of auxiliary unit, such as an oil pump. To that end, Japanese Patent Gazette Nos. 3,182,387 and 3,122,058 have proposed a double-face driving silent chain wherein pluralities of link plates on the right and left ends of the silent chain compose an exterior driving link train with their teeth oriented to the outside of the chain and pluralities of link plates interposed between the exterior driving link plates compose an interior driving link train with their teeth oriented to the inside of the chain.

Japanese Patent Gazette No. 3,182,387, which has been proposed by the present applicant, has proposed a silent chain 1 wherein the exterior driving link train is composed of link plates having the same shape with the link plates of the interior driving link train and are linked by pins on the both right and left sides of the interior driving link train so that their teeth orient to the outside (outer peripheral side).

Japanese Patent Gazette No. 3,122,058 has proposed a silent chain composed of an interior driving link train for which standard link plates are used and an exterior driving link train composed by linking link plates having main engaging teeth within and sub-engaging teeth without the chain with link plates having a flat face within (back) and small sub-engaging teeth orienting to the outside similarly to guide link plates on the both right and left sides of the interior driving link train.

The silent chain 1 in Japanese Patent Gazette No. 3,182,387 is composed of the link plates 3 ($3_1$) of the exterior driving link train 2 having the same shape with the link plates 6 of the interior driving link train 5 as shown in FIG. 9A, so that the length thereof to a flat back face 3a is shorter than that of the link plate 6 to a tooth 6a in terms of the distance from a sprocket 9. That is, the length a from a pin 7 to the back face 3a is shorter than the length h from the pin 7 to the edge of the tooth 6a (a<h). It is noted that in FIGS. 9A and 9B, the hatched link plates and whited link plates adjoin each other in rank and are alternately connected by the pins. Additionally, FIGS. 9A and 9B show the interior driving sprocket 9 and a tooth 9a thereof. The distance from the pin is a distance from the center of the pin.

Accordingly, while the inner link plate $3_1$ of the exterior driving link train 2 of the silent chain 1 described above abuts against the side face of the tooth 9a of the sprocket 9 so as to guide and engage the silent chain continuously with the sprocket 9, the length a of the link plate $3_1$ to the back face 3a is short as described above and its function as a guide is insufficient. When the silent chain 1 is used as a timing chain of an engine in particular, the silent chain 1 is apt to engage with the tooth 9a of the sprocket in a twisted manner, as shown in FIG. 9B, due to vibration of the engine itself or pulsatory motion of torque of a camshaft. This twisting causes a back corner portion D of the inner link plate $3_1$ to strike against the side c of the sprocket tooth 9a and, the inner link plates $3_1$ are interposed per pitch (rank), which often causes noise. Furthermore, because the tooth 6a of the interior driving link plate 6 of the silent chain 1 does not fully abut against the tooth 9a of the sprocket in this state, engaging pressure increases due to the partial unbalanced abutment, a crotch plane x and a flank plane y of the link plate shown in FIG. 2 as well as the surface of the sprocket tooth wear quickly, thus shortening their duration of life.

The silent chain of Japanese Patent Gazette No. 3,122,058 requires three kinds of link plates such as outermost plates (guide plates) and inner link plates (node train plates), beside the link plates of the interior driving link train. Accordingly, it is cumbersome to assemble such a silent chain. The strength of the whole silent chain is also weakened because the inner link plate is formed so that main engaging teeth orient to the inside (inner peripheral side) and sub-engaging teeth to the outside (outer peripheral side) and so that the sectional area of the center part thereof is small, thus decreasing its tensile strength, and because such an inner link plate is disposed in a rank (transverse row) on the side having one less link plate among ranks alternately linked by pins. Furthermore, because the link plate of the exterior driving link train is composed of the short sub-engaging teeth, it may not engage fully with the sprocket, thus causing deviation of teeth and early wear of the face of the teeth.

BRIEF SUMMARY OF THE INVENTION

It is therefore an object of the invention to provide a double-face driving silent chain and a silent chain power transmission device using the same, that solve the above-mentioned problems, by arranging link plates of an other-face (exterior) driving link train located on both the right and left ends of the chain.

In a first aspect of the invention includes the double-face driving silent chain wherein a large number of link plates is alternately connected by pins, a plurality of link plates on both the right and left ends of the chain composes a one-face driving link train with their teeth oriented to one side and a plurality of link plates interposed between those right and left one-face driving link trains composes another-face driving link train with their teeth oriented to the other side:

the size of each link plate of the one-face driving link train from the pin to the edge of the teeth thereof is equal to or greater than the size of each link plate of the other-face driving link train from the pin to a back face thereof; and the size of each link plate of the one-face driving link train in contact with the other-face driving link train from the pin to the back face thereof is equal to or greater than the size of each link plate of the other-face driving link train from the pin to the edge of the teeth thereof.

Preferably, in the double-face driving silent chain, the one-face driving link train is an exterior driving link train in which the link plates are arrayed in line with their teeth oriented to the outside of the chain; and the other-face driving link train is an interior driving link train in which the link plates are arrayed in line with their teeth oriented to the inside of the chain.

Still more, in the double-face driving silent chain, the size of each link plate of the exterior driving link train in contact with the interior driving link train from the pin to the edge of the back face is preferable to be equal to or greater than one-half of a chain pitch.

In the double-face driving silent chain, preferably all the link plates of the interior driving link train and the link plates of the exterior driving link train other than those in contact with the interior driving link train have the same shape when seen from the side.

In the double-face driving silent chain, preferably the link plate of the exterior driving link train in contact with the interior driving link train has a lightening hole.

In the double-face driving silent chain, preferably the thickness of all the link plates of the exterior driving link train and that of the link plates of the interior driving link train other than those in contact with the exterior driving link train are equal; and the thickness of the link plates of the interior driving link train in contact with the exterior driving link train is thinner than those link plates having equal thickness.

In the double-face driving silent chain, preferably the pin is fixed to the link plate located at the outermost side of the exterior driving link train; and all the link plates other than those located at the outermost side of the exterior driving link train and all the link plates of the interior driving link train are linked without being fixed to the pin.

According to a second aspect of the invention, a double-face driving silent chain power transmission device is composed of the double-face driving silent chain;

an exterior driving sprocket engaging with the teeth of the link plates of the exterior driving link train;

an interior driving sprocket engaging with the teeth of the link plates of the interior driving link train; and a guide arm for guiding the interior driving link train by slidably contacting with the back face of the link plates thereof; wherein the link plates of the exterior driving link train in contact with the interior driving link train guides the silent chain with inner side planes of the back face thereof abutting with the both side planes of the interior driving sprocket; and the link plates of the exterior driving link train in contact with the interior driving link train guides the silent chain with inner side faces of the teeth thereof abutting with both sides of the guide arm.

Preferably, the size between the inner side faces of the both link plates of the exterior driving link train in contact with the interior driving link train is slightly greater than the width of the tooth of the interior driving sprocket; and the both side faces of the teeth of the interior driving sprocket are chamfered.

According to the first aspect of the invention, because the teeth of each link plate of the one-face driving link train protrude as compared to the back face of the link plate of the other-face driving link train, the double-face driving silent chain runs smoothly without meandering by abutting the teeth of the inner link plate of the one-face driving link train against the both sides of the guide arm while slidably contacting the back face of the link plate of the other-face driving link train with the guide arm. Still more, because the size of the inner link plate of the one-face driving link train to the edge of the back face thereof is longer than the size of the other-face driving link train to the edge of teeth of the link plate thereof, the inner planes of the back face of the inner link plate contact with and are guided by both sides of the interior driving sprocket with enough length in the radial direction and the silent chain will not be twisted with respect to the sprocket, even if the silent chain is apt to be twisted due to vibration of an engine or pulsatory motion of torque of a camshaft. Thus, the inventive silent chain is capable of keeping the normal engagement, reducing noise which is otherwise caused and keeping its function for a long period of time.

While the other-face driving link train located inside (center) is set as the interior driving link train with their teeth of the link plates orienting to the inside, it is reasonable to cause it to function as the main power transmission device because an angle of contact of the interior driving link train to the sprocket is larger. It is also possible to keep the normal engagement by guiding the silent chain with respect to the sprocket by the inner link plates whose back face is high.

Additionally, because the distance from the pin to the back end of the inner link plate of the exterior driving link train is set to be equal to or more than one-half of the chain pitch, the inner link plate of the chain of any size contacts with the both sides of the interior driving sprocket with a full length in the radial direction, preventing the chain from twisting.

Because all the link plates of the interior driving link train and the link plates of the exterior driving link train other than those in contact with the interior driving link train have the same shape when seen from the side, investments to facilities for the double-face driving silent chain may be reduced, the chain may be readily assembled and its cost may be suppressed from increasing.

Although the size of the inner link plate of the exterior driving link train to the end of the back face increases, it is possible to suppress the weight of the link plate from increasing by forming the lightening hole. Still more, although the rank (transverse row) having the inner link plate has one less link plate, the tensile strength is balanced in the whole chain.

Further, because the rank having the outermost link plate of the interior driving link plate has one extra link plate, the weight of the whole chain may be lightened without lowering the tensile strength of the whole chain by thinning that link plate. Also, it enables the teeth of the interior driving sprocket to be readily guided between the both inner link plates of the exterior driving link train that composes the guide link plates and smoothly keeps the engagement of the interior driving link train with the interior driving sprocket.

Further, because the pin is fixed to the outermost link plates of the exterior driving link train, no special pin fixing means such as a guide plate and a ring is required. Still more, although the pin is rotatably fitted into the link plate in the same rank with the outermost link plate, it is possible to prevent them from wearing quickly because substantially no relative rotation takes place.

According to the second aspect of the invention, the double-face driving silent chain power transmission device is capable of keeping smooth and stable transmission of power for a long period of time by the stable and torsion-less exterior driving engagement of the link plates of the exterior driving link train separated to the right and left with the exterior driving sprocket having the teeth separated to the right and left so as to engage with the teeth of the link plates, the stable and torsion-less interior driving engagement caused by the inner link plates of the exterior driving link train which contact with the right and left sides of the interior driving sprocket with the sufficient length in the radial direction, and the guidance by the guide arm behind the link plates of the interior driving link train guided by the teeth of the link plates of the exterior driving link train, along with the advancement of the chain that is prevented from meandering.

The inner link plates of the exterior driving link train are readily and steadily led into the interior driving sprocket without interference, even if the back face thereof is longer, due to the size and chamfering of the interior driving sprocket and the engagement of the interior driving link train with the interior driving sprocket may be accurately kept all the times.

Additional objects and advantages of the invention will be apparent from the following detailed description of a preferred embodiment thereof, which are best understood with reference to the accompanying drawings.

BRIEF DESCRIPTION OF THE DRAWINGS

FIGS. 1A, 1B and 1C show a double-face driving silent chain power transmission device of the invention, wherein FIG. 1A is a front view of the whole silent chain, FIG. 1B is an enlarged view showing an interior driving part and FIG. 1C is an enlarged view showing an exterior driving part.

FIGS. 9A and 9B show an interior driving part of a prior art chain power transmission device, wherein FIG. 9A is a front view thereof in engaging normally and FIG. 9B is a front view thereof showing a state when the chain is engaging in twist.

DETAILED DESCRIPTION OF THE INVENTION

Modes for carrying out the invention will be explained below with reference to the accompanying drawings. FIGS. 1A, 1B and 1C show a double-face driving silent chain power transmission device of the invention, wherein the chain power transmission device 25 comprises an input-side interior driving sprocket $21_1$, an output-side interior driving sprocket $21_2$, a double-face driving silent chain 11 wound around both sprockets, an exterior (one-face) driving sprocket 20 engaging with one (upper) exterior (outer peripheral side) of the silent chain and a guide arm 22 for guiding another (lower) exterior (outer peripheral side) of the silent chain.

Figure 2:
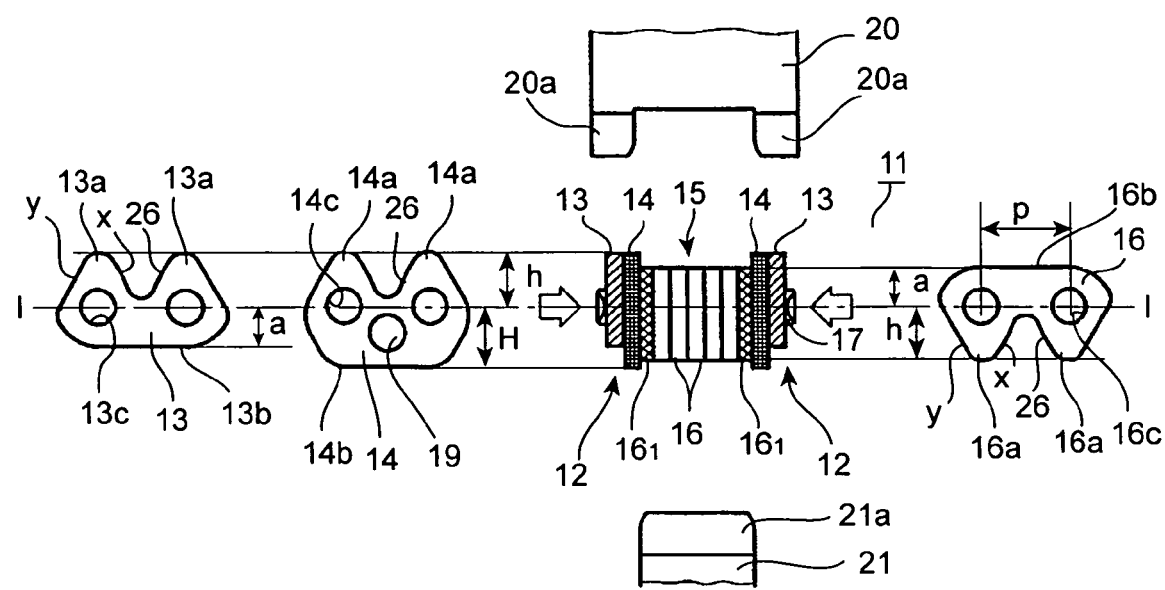
FIG. 2 is an exploded view showing a side section view of the double-face driving silent chain, a front view of respective link plates and a partial view of respective sprockets.
Figure 3:
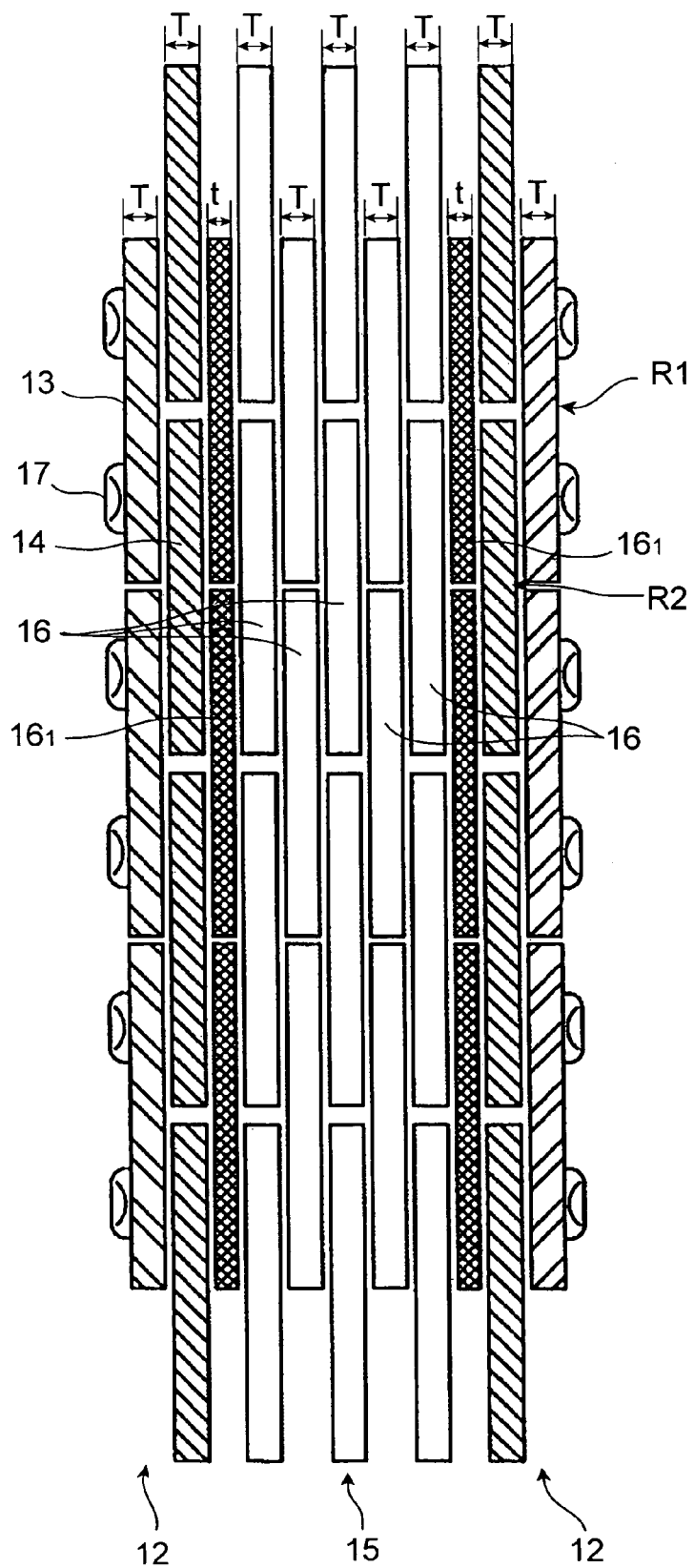
FIG. 3 is a plan view of the double-face driving silent chain.

As shown in FIGS. 2 and 3, the silent chain 11 is composed of link plates alternately and endlessly connected by pins 17, wherein an exterior driving link train 12 composed of two link plates 13 and 14 connected so that their teeth 13a and 14a orient to the outside (outer peripheral side) of the chain, i.e., the first driving link side facing in a first direction, are arrayed on both right and left sides (i.e., the first and second lateral sides) of the chain and interior driving link train 15 composed of a plurality of link plates 16 connected so that their teeth 16a orient to the inside (inner peripheral side) of the chain, i.e., the second driving link side facing in a second direction, are arrayed between the exterior driving link trains 12. Each of the link plates 13, 14 and 16 has two teeth 13a, 14a and 16a formed respectively by a crotch plane x and a flank plane y divided by a crotch 26, flat back faces 13b, 14b and 16b and two pin holes 13c, 14c and 16c into which the pins 17 are fitted. Except of the link plates (inner link plates) 14 of the exterior driving link train 12 in contact with the interior driving link train 15, other link plates, i.e., the link plates (end-side link plates) 13 on the both ends of the exterior driving link train and all the interior driving link plates 16, have the same shape when seen from the side, or more specifically, are silent link plates having a standard shape.

The inner link plate 14 of the exterior driving link train 12 is formed so that the back face 14b thereof expands to the outside as compared to the other link plates. That is, while the size a from the center line (pitch line) 1-1 of the pin holes 16c and 13c to the back face 16b and 13b of the standard link plates 16 and 13 is smaller than the size h from the pitch line to the edge of the teeth (a<h), the size H of the link plate 14 from the pitch line 1-1 to the back face 14b is equal to or greater than the size h from the pitch line to the edge of the teeth (H≧h) or more preferably, the size H to the back face 14b is equal to or greater than the size h to the edge of the teeth 14a by a predetermined distance m, e.g., m=0.05 p, where p is the pitch (H≧h+m). The link plate 14 has a circular (or elliptical or oval) lightening hole 19 formed on the back thereof.

In concrete, while the link plates 16 and 13 having the standard shape have the size h from the pitch line to the edge of the teeth of 0.5 p (p: chain pitch) and the size a from the pitch line to the back face of 0.45 p, the link plate 14 has the size H from the pitch line to the back face of 0.5 p or more (H≧0.05 p) or more preferably H≧0.60 p, although the size h to the edge of the tooth is the same.

Except the link plates (outer link plates) 16, of the interior driving link train 15 which are in contact with the exterior driving link train 12, all the other link plates, i.e., the link plates 13 and 14 of the exterior driving link train 12 and the link plates 16 other than the outer link plates of the interior driving link train 15, have the same thickness T. The link plate $16_1$ has a thickness t, thinner than the thickness T (T>t). For example, while the thickness T of the other link plates 13, 14 and 16 is 1.20 [mm] in a chain having a pitch of 6.35 [mm], the thickness t of the outer link plate $16_1$ is 0.90 [mm].

As shown in FIG. 3, a rank (transverse row) R1 having the link plate $16_1$ has one extra link plate as compared to a rank R2 adjacent thereto. Specifically, while the rank R1 has four interior driving link trains 15, the rank 2 has three interior driving link trains 15 and while the total thickness of the rank R1 including the exterior driving link train 12 (T×4+t×2) is 6.6 [mm], the total thickness of the rank R2 (T×5) is 6.0 [mm]. Although the total thickness of the rank R1 is slightly thicker than that of the rank 2 when the link plates are made of the same material, are similarly treated by heat (so as to have the same hardness) and have the same tensile stress, the balance of the tensile strength of the both ranks R1 and R2 is almost equalized because the height (H) to the back face of the inner link plate 14 of the exterior driving link train 12 in the rank R2 is actually long and the tensile strength is large.

Still more, although the inner link plate 14 of the exterior driving link train 12 has the greater size H to the back face thereof and has a structure whose tensile strength is high by itself, the tensile strength may be set at a predetermined value by lightening or reducing its weight by the lightening hole 19 and by adequately designing its size and shape (including a case of not forming the lightening hole). Thereby, the tensile strength of the rank R2 having the inner link plate 14 may be adjusted and the balance of the tensile strength of the both ranks R1 and R2 may be further improved.

The pin 17 is secured by caulking after being fitted into pin holes 13c of the both end link plates 13 of the exterior driving link train 12. While the respective link plates 14 and 16, located inside the both end link plates 13, have pin holes of the same size, through which the pin 17 is rotatably inserted, the respective link plates $16_1$ and $16_1$ in the same rank R1 with the both end link plates 13 cause no relative rotation with the pin 17. Accordingly, pin holes 16c will not wear so quickly even if the outer link plate $16_1$ of the link plate 16 is thin because it causes no relative rotation with the pin 17. It is noted that those link plates may be linked so as not to rotate with respect to the pin by press-fitting the pin to the pin hole of the respective link plates of the rank R1.

Figure 4:
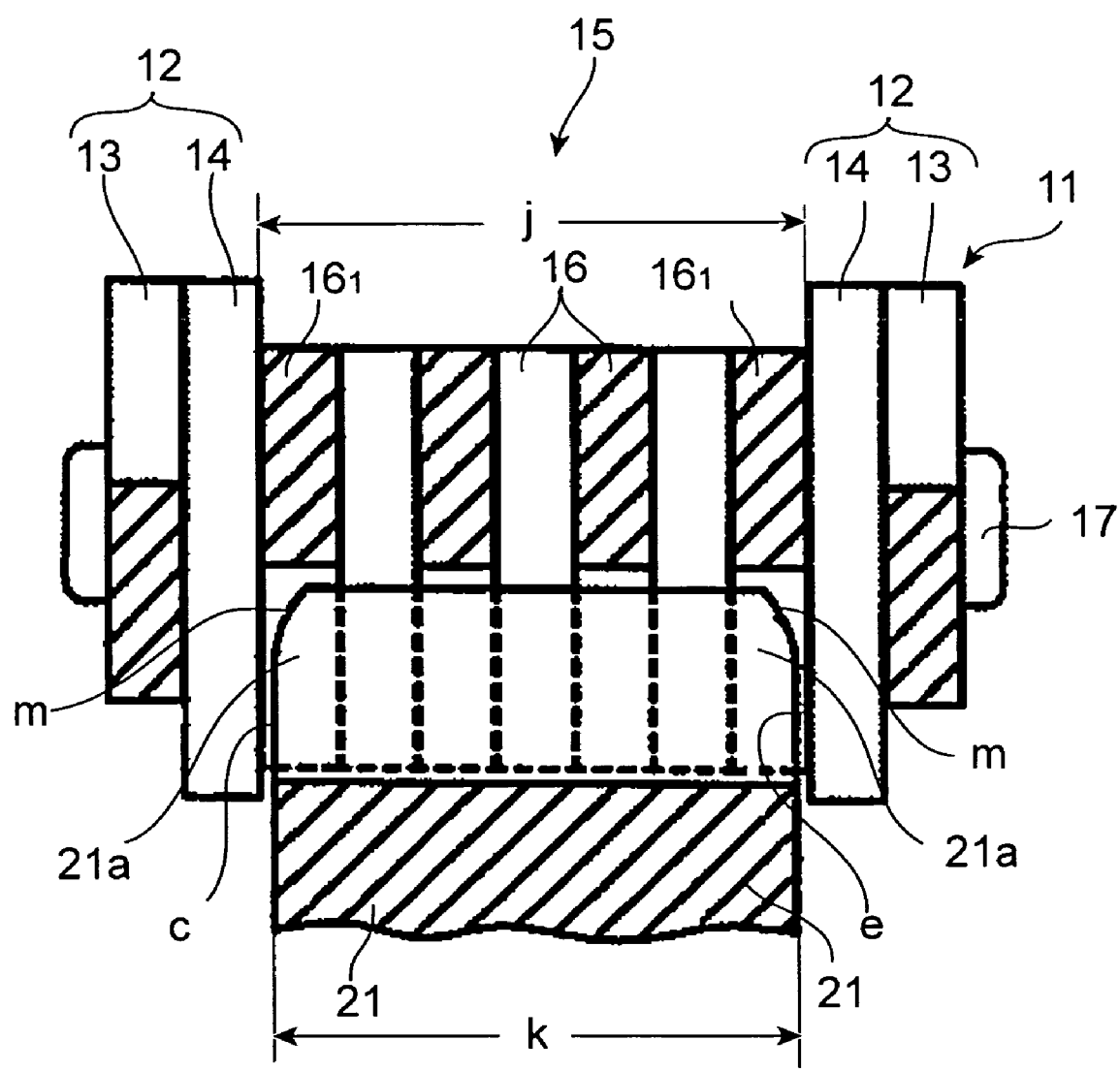
FIG. 4 is a section view showing a chain engaging part of an interior driving sprocket.

As shown in FIG. 4 in detail, an interior driving sprocket 21 has sprocket teeth 21a of the standard shape matching with the chain pitch p. The sprocket teeth 21a engage with the teeth 16a of the respective link plates 16 of the interior driving link train 15 of the silent chain 11. A width (tooth width) k of the sprocket 21 is slightly smaller than (or almost equally with) a distance j between the inner link plates 14 of the exterior driving link train 12 of the silent chain 11. The outer corners m of the sprocket tooth 21a are chamfered.

Figure 5:
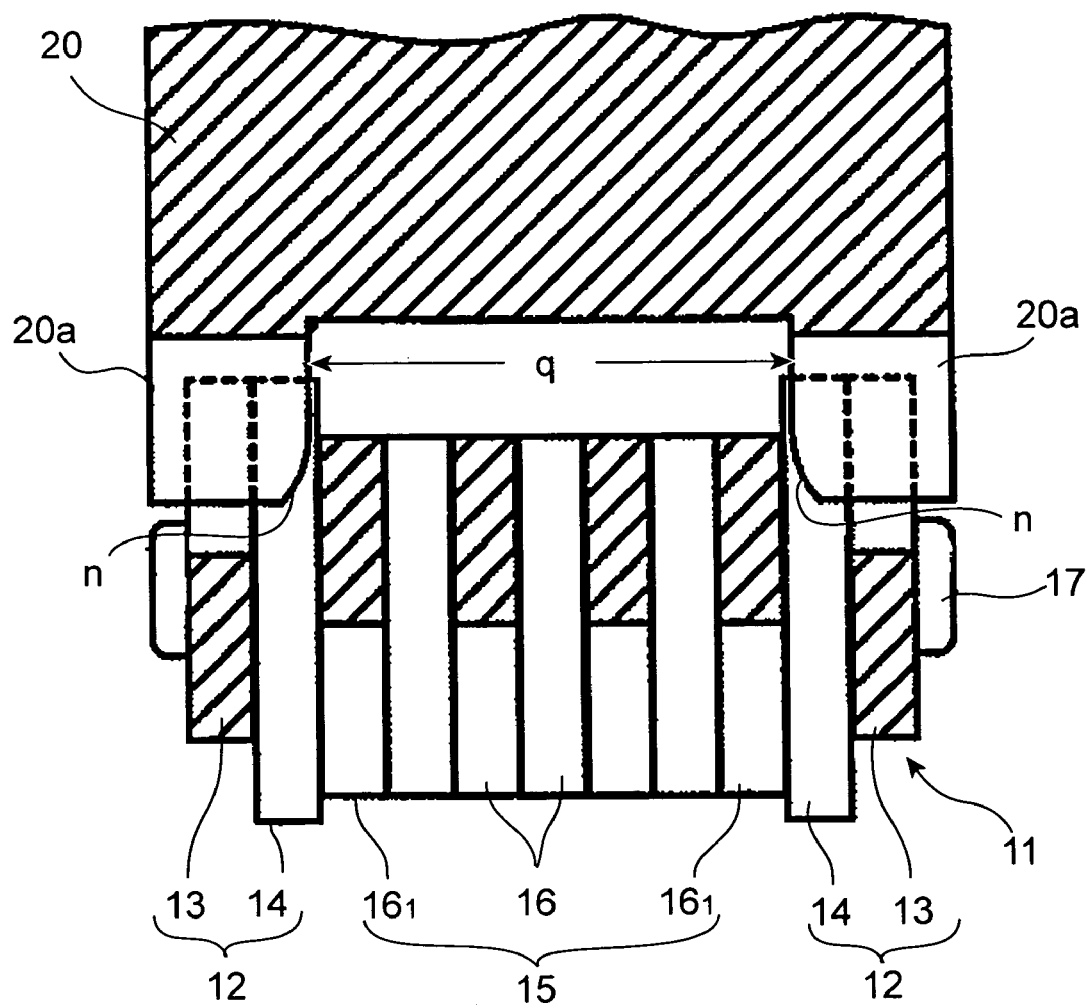
FIG. 5 is a section view of a chain engaging part of an exterior driving sprocket.

As shown in FIG. 5, an exterior driving sprocket 20 has sprocket teeth 20a formed at both right and left ends separated by a predetermined distance, i.e., a distance q almost equal to the distance j of the interior driving link train described above (j≈q). These sprocket teeth 20a have the standard shape matching with the chain pitch p and engage with the teeth 13a and 14a of the link plates 13 and 14 of the exterior driving link train 12 of the silent chain 11. The inner corners n of each sprocket tooth is chamfered.

Figure 6:
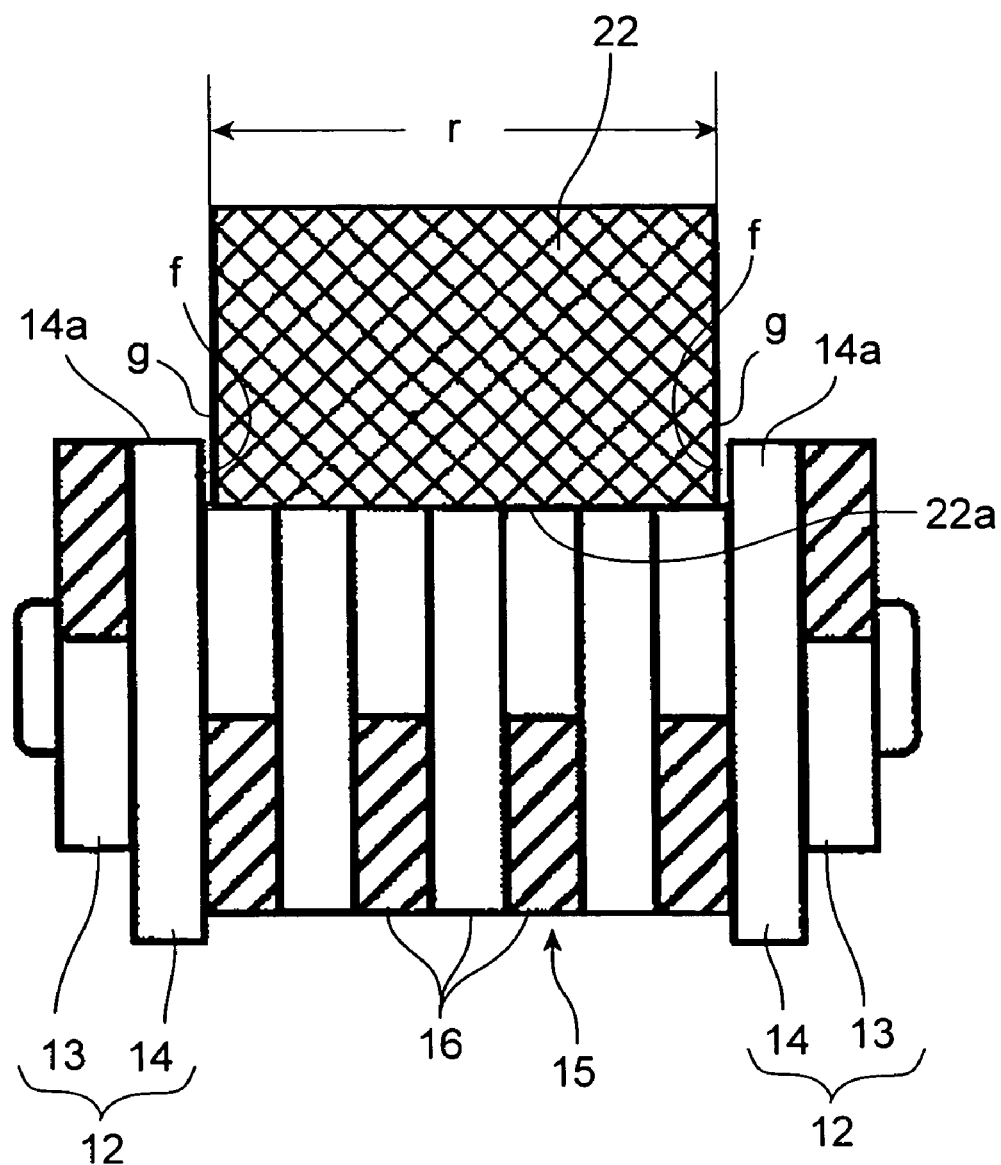
FIG. 6 is a section view showing a state of a guide arm in guiding the chain.

As shown in FIG. 6, a guide arm 22 has a predetermined length so as to be disposed along the longitudinal direction of the chain 11 and has a width r slightly smaller than the distance j of the inner link plates 14 of the exterior driving link train 12. At least one face 22a of the guide arm 22 is formed to be flat so as to contact with all the back face 16b of the respective link plates of the interior driving link train 15. The guide arm 22 is made of a material such as plastics or steel member (plate) whose friction coefficient is small. It is noted that the slidable-contact face of the guide arm 22 may be put into a lubricant environment or dried environment.

Because the silent chain of the present embodiment is constructed as described above, when the input-side interior driving sprocket $21_1$ is driven, the silent chain 11 rotates and runs, rotating the output-side interior driving sprocket and the exterior driving sprocket 20. It is noted that because the input-side and output-side interior driving sprockets $21_1$ and $21_2$ are identical in terms of the engagement with the chain 11, they will be explained simply as the interior driving sprocket 21 hereinafter. While transmission of power advances as the interior or exterior crank plane of each tooth 16a of each link plate 16 of the interior driving link train 15 of the chain 11 engages with the sprocket tooth 21a of the interior driving sprocket 21, the side planes e of the back face of the both inner link plates 14 of the interior driving link train 15 abut against and guide the both planes c of one each sprocket tooth 21a at this time as if they sandwich the tooth 21a as shown in FIGS. 1B and 4. Because the link plate 14 is formed so that the back face 14b thereof is higher (H) than that of the other link plates, the chain is firmly guided by the higher inner link plates 14 even if the sprockets or the chain vibrate due to vibration of an engine for example. Accordingly, the chain 11 will not be twisted with respect to the sprocket 21 and the normal engagement among the link plate teeth 13a and 14a and the sprocket tooth 21a may be kept.

Additionally, because the distance j between both inner link plates 14 of the silent chain 11 is slightly larger than the width k of the interior driving sprocket tooth 21a, along with the sprocket teeth 14a being chambered and that a slight looseness is given in the pin axial direction of each rank, each rank of the chain 11 is led into the sprocket tooth 21a smoothly, one after another even if the back face of the link plate 14 is formed to be higher (H). Furthermore, although the thickness t of the outer link plate $16_1$ of the interior driving link train 15 is thin, the interior driving link plates of the rank R1 having the outer link plate 16, include one extra link plate as compared to the interior driving link plates of the rank R2 adjacent thereto. Accordingly, although a contact area of the rank R1 with the sprocket tooth increases (e.g., 4.2 [mm] =1.2×2+0.9×2>3.6 [mm]=1.2×3), the part m of the sprocket tooth 21a engaging with the outer link plate $16_1$ is chamfered and the contact area is reduced to that extent. Thereby, along with the balanced tensile strength of the both ranks R1 and R2 of the chain described above, power may be efficiently transmitted because the areas abutting against the teeth of the both ranks R1 and R2 are almost equalized.

The crotch plane x or the flank plane y of the teeth 13a and 14a of the link plates 13 and 14 of the exterior driving link train 12 of the chain 11 engage with the teeth 20a of the exterior driving sprocket 20 one after another and thereby power is transmitted as shown in FIGS. 1C and 5. At this time, the chain 11 engages with the sprocket 20 stably, even though the structure is simple; thereby, the normal engagement is kept because the exterior driving link train 12 is divided on both right and left ends of the chain 11 and the teeth 20a of the exterior driving sprocket 20 are also located at the both right and left outer ends of the sprocket.

The silent chain 11 is guided such that both inner planes f of the teeth 14a of the inner link plates 14 of the exterior driving link train 12 sandwich the both side planes g of the guide arm 22 and runs such that the flat back faces 16a of the link plates 16 of the interior driving link train 15 slidably contact with a guide plane 22a of the guide arm 22. Thereby, the silent chain 11 is blocked from meandering.

Additionally, noise of the double-face driving silent chain power transmission device 25 may be reduced and its high transmitting performance and efficiency may be kept for a long period of time, because the chain is blocked from running in a twisted manner and the normal engagement is always kept.

Figure 7:
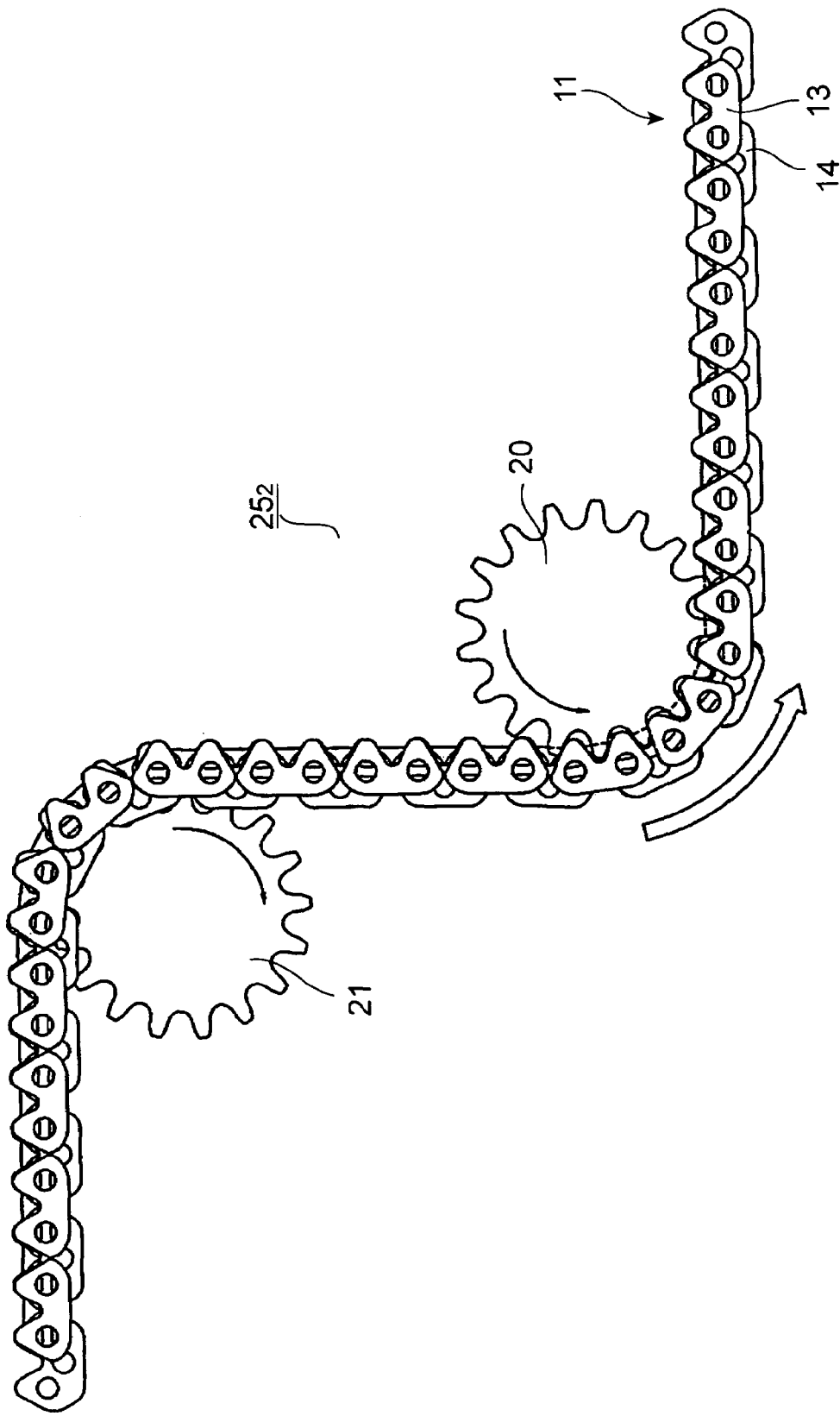
FIG. 7 is a partial front view showing a chain power transmission device according to another embodiment.

FIG. 7 shows a silent chain power transmission device $25_2$ according to another embodiment using the silent chain 11. According to the double-face driving silent chain power transmission device $25_2$, the teeth of the link plates 13 and 14 of the link train 12 located at both right and left ends in the direction of transverse row (rank) may be disposed in the inner peripheral direction of the chain 11 and the teeth of the link plates 16 of the link train 15 therebetween may be disposed in the outer peripheral direction of the chain 11. That is, the direction of link of the endless chain 11 may be reversed from that shown in FIG. 1. That is, the one-face driving link train 12 is constructed by orienting the teeth of the link plates 13 and 14 of both right and left ends to one direction and the other-face driving link train 15 is constructed by orienting the teeth of the link plates 16 therebetween to the other direction. The sprocket 20 engaging with one-face driving link train 12 located at both right and left ends has the shape as shown in FIG. 5 and the sprocket engaging with the other-face driving link train 15 therebetween has the shape as shown in FIG. 4 also in this case.

Figure 8:
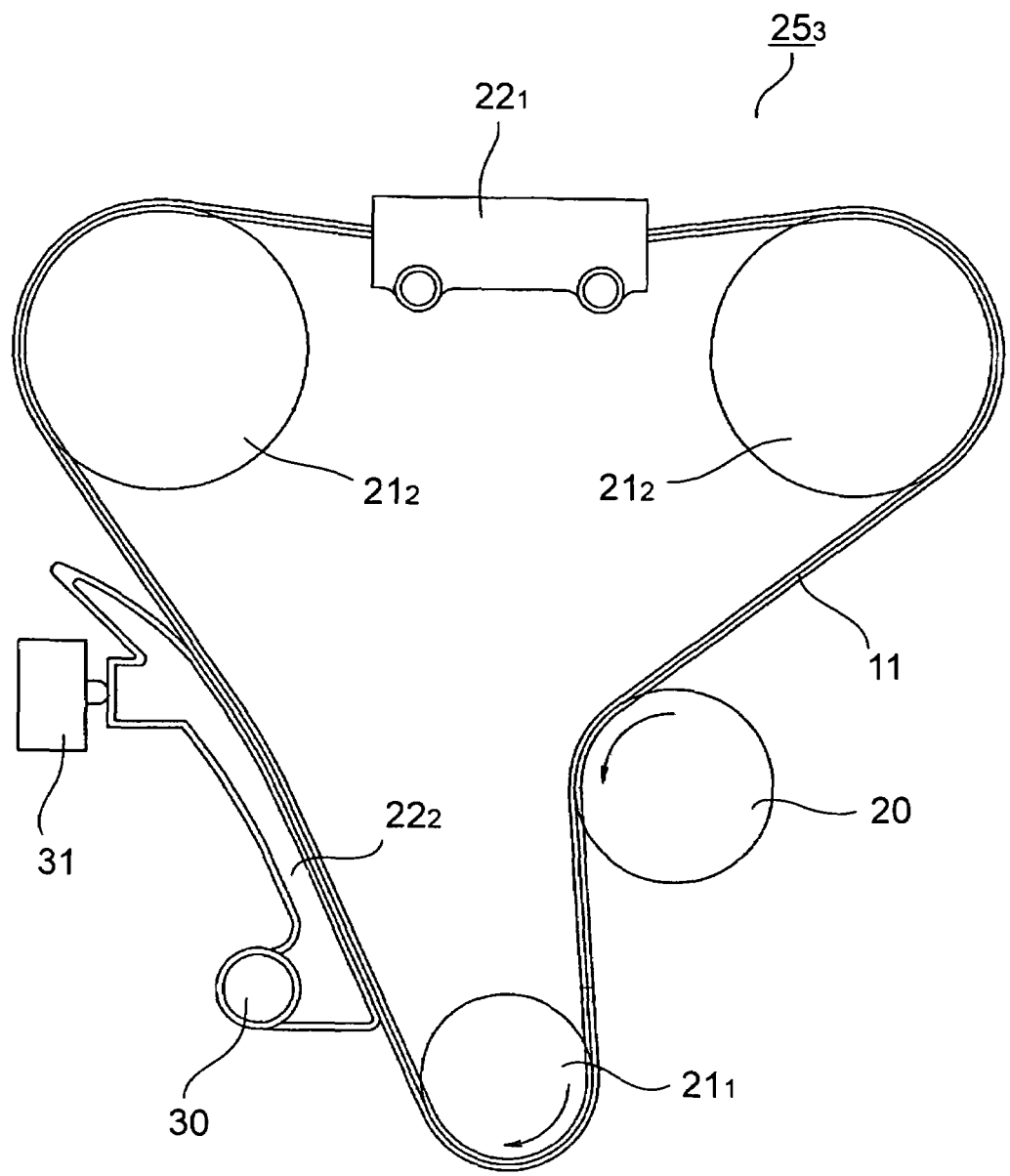
FIG. 8 is a front view showing the embodiment applied to a timing chain power transmission device.
Figure 9A:
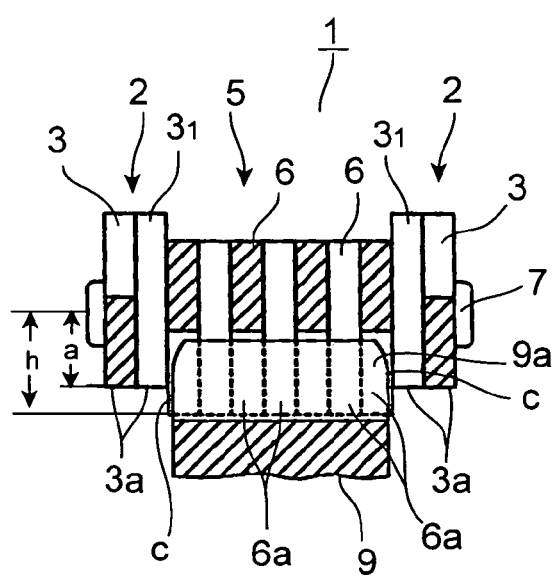
Figure 9B:
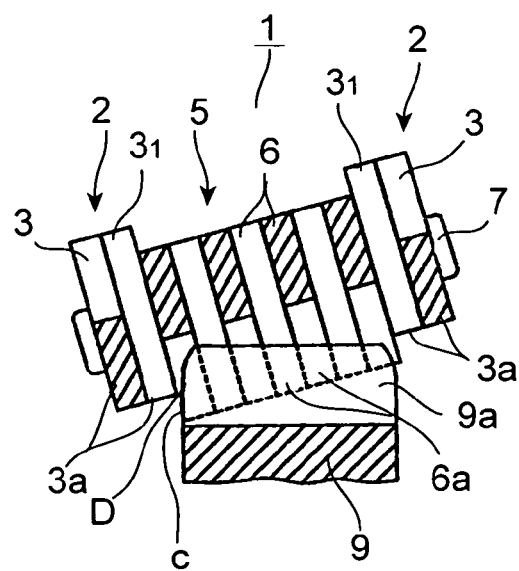

FIG. 8 shows an embodiment in which the silent chain 11 is used as a timing chain. In the figure, an input-side interior driving sprocket $21_1$ is fixed to an engine crankshaft and output-side interior driving sprockets $21_2$ are fixed to camshafts. They are substantially the same with the interior driving sprockets 21 shown in FIGS. 1 and 4. An exterior driving sprocket 20 is fixed to a shaft for driving auxiliary unit such as an oil pump and is substantially the same with the exterior driving sprocket 20 shown in FIGS. 1 and 5. A guide arm $22_1$ is made of plastics and is substantially the same with the guide arm 22 shown in FIGS. 1 and 6. A hinge 30 rotatably supports a guide arm $22_2$. A hydraulic actuator 31 for effecting hydraulic pressure caused by the oil pump abuts against its edge. Functionally, it is the same as the guide arm shown in FIGS. 1 and 6.

In the timing chain power transmission device $25_3$, the timing chain, which is substantially identical to the silent chain 11 shown in FIGS. 2 and 3 is passed around the input-side interior driving sprocket $21_1$ to transmit rotation of the crankshaft, and the right and left output-side interior driving sprockets $21_2$ to drive the camshaft at a predetermined timing. At this time, the guide arm $22_1$ and the guide arm $22_2$, i.e., a tightener, guide the chain 11 and keep its predetermined tension.

While the preferred embodiments have been described, variations thereto will occur to those skilled in the art within the scope of the present inventive concepts which are delineated by the following claims.

What is claimed is:

1. A double face driving chain having a first lateral side, a second lateral side, a first driving link side facing in a first direction and a second driving link side facing in a second direction, said double face driving chain comprising:
   a plurality of first link plates and a plurality of second link plates alternately connected by pins, each of said first link plates including a set of first teeth, and each of said second link plates including a set of second teeth, said first link plates and said second link plates being disposed on the first lateral side;
   a plurality of third link plates and a plurality of fourth link plates alternately connected by said pins, each of said third link plates including a set of third teeth and each of said fourth link plates including a set of fourth teeth, said third link plates and said fourth link plates being disposed on the second lateral side, said first, second, third and fourth link plates being constructed and arranged to form a first driving link train, such that each set of said first, second, third and fourth teeth are disposed on said first driving link side; and
   a plurality of fifth link plates positioned between said second link plates and said fourth link plates and having a set of fifth teeth, said fifth link plates being constructed and arranged to form a second driving link train, such that each set of said fifth teeth are disposed on said second driving link side;
   wherein, each pin of said pins passes through at least one of each of said first, second, third, fourth and fifth link plates, and, for each said pin, a distance from a center of said pin to an edge of said first, second, third and fourth teeth of said at least one of each of said first, second, third and fourth link plates through which said pin passes is equal to or greater than a distance from the center of said pin to a back face of said at least one of said fifth link plates through which said pin passes; and
   wherein, for each said pin, a distance from the center of said pin to a back face of each of said at least one of said second and fourth link plates through which said pin passes is greater than a distance from the center of said pin to an edge of said fifth teeth of said at least one of said fifth link plates through which said pin passes.

2. The double face driving chain as set forth in claim 1, wherein the first driving link side faces to an exterior of said double face driving chain and said first and third link plates are arrayed in a line, such that said first and third teeth are disposed at an outer peripheral side of the first lateral side of said double face driving chain and said second and fourth link plates are arrayed in a line, such that said second and fourth teeth are disposed at an outer peripheral side of the second lateral side of said double face driving chain; and the second driving link side faces to an interior of said double face driving chain and said fifth link plates are arrayed in line, such that said fifth teeth are disposed at an inner central portion of said double face driving chain.

3. The double face driving chain as set forth in claim 2, wherein the distance from the center of each of said pins to said back face of each of said second and fourth link plates is equal to or greater than one-half of a chain pitch.

4. The double face driving chain as set forth in claim 2, wherein each of said first, third and fifth link plates has the same shape.

5. The double face driving chain as set forth in claim 2, wherein each of said second and fourth link plates has a lightening hole.

6. The double face driving chain as set forth in claim 2, wherein a thickness of each of said first, third and fifth link plates is equal; and
   a thickness of said second and fourth link plates is less than the thickness of said first, third and fifth link plates.

7. The double face driving chain as set forth in claim 2, wherein said pins are fixed to said first and third link plates; and
   said second and fourth link plates are linked to the first and third link plates, respectively, without being fixed to said pins.

8. A double face driving chain power transmission device having a first lateral side, a second lateral side, a first driving link side facing in a first direction and a second driving link side facing in a second direction, said double face driving chain power transmission device comprising:
   a double-face driving chain including
      a plurality of first link plates and a plurality of second link plates alternately connected by pins, each of said first link plates including a set of first teeth, and each of said second link plates including a set of second teeth, said first link plates and said second link plates disposed on the first lateral side,
      a plurality of third link plates and a plurality of fourth link plates alternately connected by said pins, each of said third link plates including a set of third teeth and each of said fourth link plates including a set of fourth teeth, said third link plates and said fourth link plates disposed on the second lateral side, said first, second, third and fourth link plates being constructed and arranged to form an exterior driving link train, such that each set of said first and second teeth is disposed on an outer peripheral portion of the first lateral side and each set of said third and fourth teeth are positioned on an outer peripheral portion of the second lateral side, and
      a plurality of fifth link plates positioned between said second link plates and said fourth link plates and having a set of fifth teeth, said fifth link plates being constructed and arranged to form an interior driving link train, such that each set of said fifth teeth is disposed at an inner central portion of said double-face driving chain;
   an exterior driving sprocket configured to engage said first, second, third and fourth teeth;
   an interior driving sprocket having sprocket teeth configured to engage said fifth teeth; and
   a guide arm configured to guide said interior driving link train by slidably contacting a back face of each of said fifth link plates;
   wherein, each pin of said pins passes through at least one of each of said first, second, third, fourth and fifth link plates, and, for each said pin, the distance from a center of said pin to an edge of said first, second, third and fourth teeth of said at least one of each of said first, second, third and fourth link plates through which said pin passes is equal to or greater than a distance from the center of said pin to a back face of said at least one of said fifth link plates through which said pin passes, and a distance from the center of said pin to a back face of each of said at least one of each said second and fourth link plates through which said pin passes is greater than a distance from the center of said pin to an edge of said teeth of said at least one of said fifth link plates through which said pin passes;

wherein said second and fourth link plates include second and fourth inner side planes, respectively, and each said second inner side plane of each said second link plate is adjacent each said back face of each said second link plate, and each said fourth inner side plane of each said fourth link plate is adjacent each said back face of each said fourth link plate, said second and fourth inner side planes are configured to guide said double-face driving chain by abutting with side faces of said interior driving sprocket; and wherein said second and fourth link teeth include second and fourth teeth inner side planes, respectively, said second and fourth teeth inner side planes being configured to guide said double-face driving chain by abutting with sides of said guide arm.

9. The double face driving chain power transmission device according to claim 8, wherein a distance from the center of each of said pins to a back face of each of said second and fourth link plates is equal to or greater than one-half of a chain pitch.

10. The double face driving chain power transmission device according to claim 8, wherein each of said first, third and fifth link plates has the same shape.

11. The double face driving chain power transmission device according to claim 8, wherein each of said second and fourth link plates has a lightening hole.

12. The double face driving chain power transmission device according to claim 8, wherein a thickness of each of said first, third and fifth link plates is equal; and a thickness of said second and fourth link plates is less than the thickness of said first, third and fifth link plates.

13. The double face driving chain power transmission device according to claim 8, wherein said pins are fixed to said first and third link plates; and said second and fourth link plates are linked to the first and third link plates, respectively, without being fixed to said pins.

14. The double face driving chain power transmission device according to claim 8, wherein a distance between said second inner side face and said fourth inner side face is greater than a width of said teeth of said interior driving sprocket; and side faces of said teeth of said interior driving sprocket are chamfered.

* * * * *

UNITED STATES PATENT AND TRADEMARK OFFICE
CERTIFICATE OF CORRECTION

PATENT NO. : 7,641,578 B2 Page 1 of 1
APPLICATION NO. : 11/151273
DATED : January 5, 2010
INVENTOR(S) : Matsui et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1240 days.

Signed and Sealed this

Sixteenth Day of November, 2010

David J. Kappos
*Director of the United States Patent and Trademark Office*